US 8,427,980 B2

(12) United States Patent
McLaren et al.

(10) Patent No.: US 8,427,980 B2
(45) Date of Patent: Apr. 23, 2013

(54) METHODS AND APPARATUS TO DETERMINE AND IMPLEMENT MULTIDIMENSIONAL NETWORK TOPOLOGIES

(75) Inventors: Moray McLaren, Bristol (GB); Jung Ho Ahn, Seoul (KR); Nathan Lorenzo Binkert, Redwood, CA (US); Alan Lynn Davis, Coalville, UT (US); Robert Samuel Schreiber, Palo Alto, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 275 days.

(21) Appl. No.: 12/841,039

(22) Filed: Jul. 21, 2010

(65) Prior Publication Data

US 2012/0020242 A1   Jan. 26, 2012

(51) Int. Cl.
 *H04L 12/28* (2006.01)
(52) U.S. Cl.
 USPC .............................. 370/255; 370/254; 370/257
(58) Field of Classification Search .................. 370/254, 370/255, 257
 See application file for complete search history.

(56) References Cited

U.S. PATENT DOCUMENTS

| | | | | |
|---|---|---|---|---|
| 4,805,091 A | * | 2/1989 | Thiel et al. ....................... | 712/12 |
| 5,170,482 A | * | 12/1992 | Shu et al. ......................... | 712/12 |
| 2003/0079188 A1 | * | 4/2003 | McConaghy et al. ............. | 716/2 |
| 2003/0218989 A1 | * | 11/2003 | El-Amawy et al. ............. | 370/255 |
| 2004/0228634 A1 | * | 11/2004 | Fricker ............................ | 398/135 |

OTHER PUBLICATIONS

Rodriguez-Salazar, et al., "Hamming hypermeshes: High performance interconnection networks for pin-out limited systems", Performance Evaluation, 2006, 17 pages.
Wikipedia, "Hamming graph," http://en.wikipedia.org/wiki/Hamming-graph, Retrieved on Jun. 22, 2010, 1 page.
John Kim et al., "Flattened Butterfly: A Cost-Efficient Topology for High-Radix Networks," ISCA, Jun. 9-13, 2007, 12 pages.
John Kim et al., "Technology-Driven, Highly Scalable Dragonfly Topology," ISCA, 2008,12 pages, Beijing, China.
Takahiko Sabano et al., "Development of Reference MT Ferrule using Insert-molded Metal Plate," OFA/NFOEC 2008, 3 pages.
Ted Szymanski, "'Hypermeshes': Optical Interconnection Networks for Parallel Computing," Journal of Parallel and Distributed Computing, vol. 26, 1995, 23 pages.

* cited by examiner

*Primary Examiner* — Dang Ton
*Assistant Examiner* — Robert M Morlan

(57) ABSTRACT

Methods and apparatus to determine and implement multidimensional network topologies are disclosed. An example method disclosed herein comprises receiving an input parameter for determining a multidimensional network topology for a network interconnecting a plurality of devices, and determining a set of multidimensional network topologies, each multidimensional network topology of the set comprising a respective plurality of nodes to interconnect the plurality of devices, each node in each multidimensional network topology of the set being fully connected with all neighbor nodes in each dimension of the multidimensional network topology, and each multidimensional network topology of the set satisfying a first constraint based on the input parameter.

12 Claims, 11 Drawing Sheets

METHODS AND APPARATUS TO DETERMINE AND IMPLEMENT MULTIDIMENSIONAL NETWORK TOPOLOGIES

BACKGROUND

Computer and communication networks commonly use multiple network nodes, such as switches, routers, bridges, etc., to interconnect terminal devices (also referred to as endpoint devices). Example terminal devices include computers, servers, processors, interfaces to other devices, etc. In many networks, such as multi-processor networks, a single type of network node (often implemented as a single chip) having a fixed number of ports is used to interconnect the terminal devices in the network. The number of ports supported by a network node is also referred to as the radix of the node.

A network topology specifies, among other things, the radix of the network nodes implementing the network, and how the terminal devices and nodes are interconnected to form the network. As such, the network topology determines whether pairs of terminal devices in the network are interconnected directly by a single network node, or indirectly via one or more network hops corresponding to one or more additional network nodes used to interconnect the pair of terminal devices. Due to practical limitations, network topology design and implementation has often been limited to employing network nodes having a relatively low radix. However, recent advances in chip and communication technology have enabled the use of higher radix network nodes, which can result in network topologies having fewer nodes and hops than previously possible.

DETAILED DESCRIPTION

Figure 1:
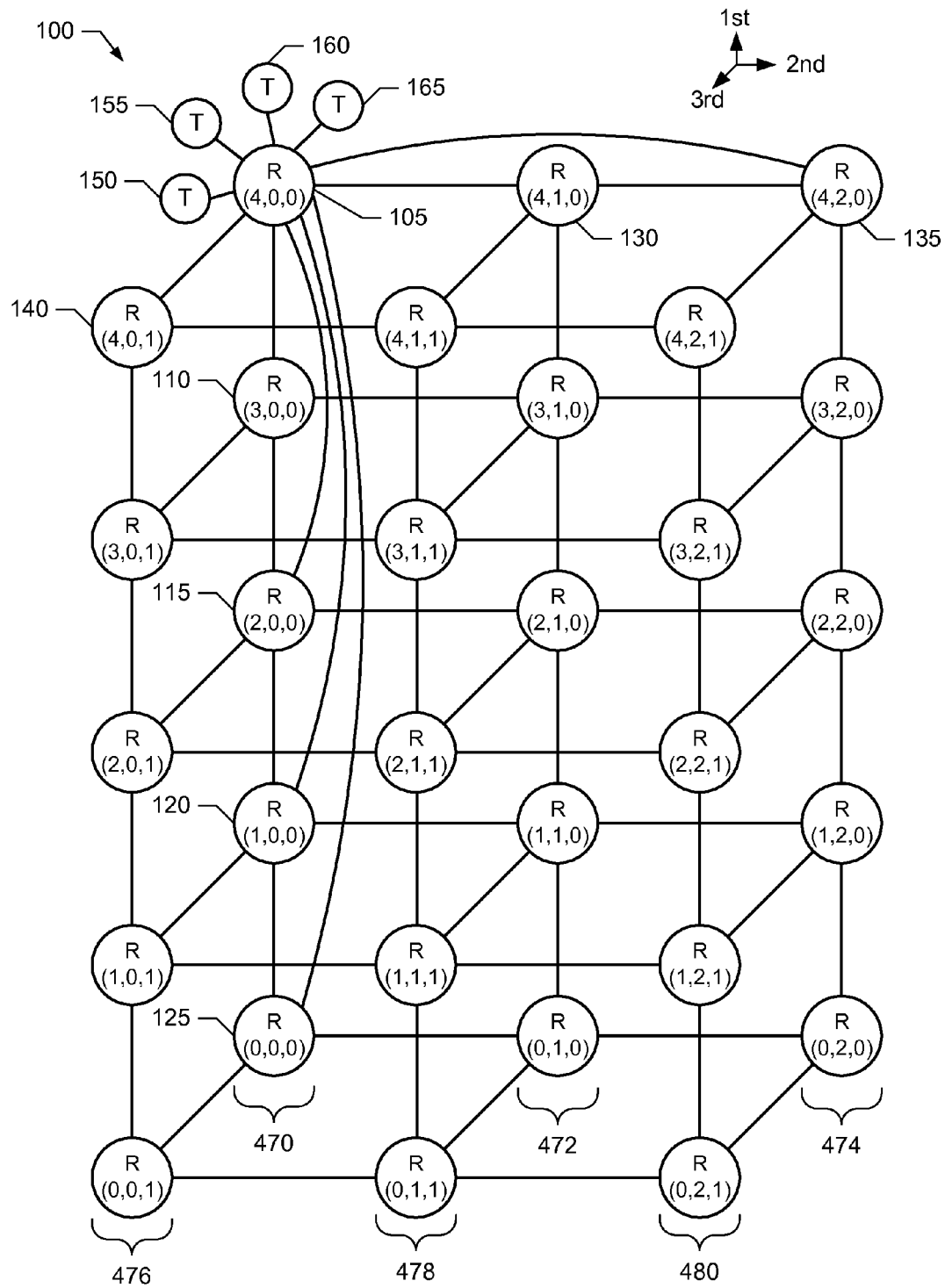
FIG. 1 is block diagram of a first example multidimensional network topology that may be determined by the methods and apparatus disclosed herein.

Methods and apparatus to determine and implement multidimensional network topologies are disclosed herein. Although the following discloses example methods and apparatus including, among other components, software executed on hardware, it should be noted that such methods and apparatus are merely illustrative and should not be considered as limiting. For example, it is contemplated that any or all of these hardware and software components could be implemented exclusively in hardware, exclusively in software, exclusively in firmware, or in any combination of hardware, software, and/or firmware. Accordingly, while the following describes example methods and apparatus, the examples provided are not the only way to implement such methods and apparatus.

As described in greater detail below, an example technique for determining multidimensional network topologies disclosed herein includes receiving an input parameter for determining a multidimensional network topology for a network interconnecting a plurality of devices (also referred to herein as terminal devices or terminals). The example technique also includes determining a set of multidimensional network topologies, with each multidimensional network topology of the set containing a respective plurality of nodes (e.g., network nodes, such as switches, bridges, routers, etc.) to interconnect the plurality of devices. Each multidimensional network topology determined by the example technique is a member of a particular class of topologies (referred to herein as HyperX topologies) in which each node in each multidimensional network topology is fully connected (also referred to herein as all-to-all connected) with all of its neighbor nodes in each dimension of the multidimensional network topology. For example, a complete set of neighbor nodes to be fully connected in a particular dimension of such a multidimensional network topology all have equal topology coordinate vectors (also referred to as topology coordinate addresses) for all dimensions of the multidimensional network topology other than the particular dimension. As described in greater detail below, the example technique includes only those multidimensional network topologies satisfying a first constraint based on the input parameter in the determined set of multidimensional topologies. Examples of input parameters and corresponding constraints that could correspond to the first constraint are described in greater detail below.

In at least some examples, the technique identifies a particular multidimensional network topology of the determined set of multidimensional network topologies satisfying the first constraint and also a second constraint. Examples of constraints that could correspond to the second constraint are described in greater detail below. Additionally or alternatively, in at least some of examples, the technique determines board and backplane layouts, ribbon cable mappings and chassis grouping layouts to implement the particular multidimensional network topology. Examples of determining such layouts and mappings are described in greater detail below.

The example multidimensional network topology determination and implementation techniques described herein can provide significant advantages over existing techniques. For example, many existing techniques for designing network topologies using high radix network nodes are ad-hoc and/or require the network topology to have a specific, stylized design pattern. In contrast, the example techniques described herein provide a framework for determining topologies for a class of multidimensional networks that are not limited to specific, stylized design patterns but, instead, are flexible and can have almost any dimensionality, number of nodes per dimension, radix per node, etc. Additionally, the example disclosed topology determination techniques are able to determine a particular multidimensional topology from this class of topologies that satisfies one or more design constraints using a deterministic, rather than ad-hoc, procedure. For example, the disclosed topology determination techniques can guarantee determination of a particular multidimensional network topology that (1) utilizes network nodes all having a particular radix (port count) and/or in which each network node connects to a specific number of terminal devices, (2) achieves a particular minimum throughput (e.g., bandwidth) under worst case traffic patterns, (3) optimizes a particular metric (e.g., such as minimizing a total number of required network nodes), etc.

Furthermore, many existing techniques for implementing network topologies using high radix network nodes result in implementations having cables that run from various outer levels or columns of network nodes to a central or top level of nodes. Such existing implementations can yield excessive congestion and/or very irregular cable lengths at the central or top level of nodes, resulting in increased complexity and cost for installation and maintenance. In contrast, the example techniques described herein result in multidimensional network implementations in which the network nodes distribute processing (e.g., routing) evenly throughout the network, rather than being concentrated at a central or top level of nodes. Additionally, the example disclosed techniques provide board and chassis layouts that can be interconnected using ribbon cables having regular lengths, thereby simplifying installation and maintenance and reducing cost.

Turning to the figures, a block diagram of an example multidimensional network topology 100 of the class of topologies capable of being determined and implemented using the example techniques disclosed herein is illustrated in FIG. 1. This class of topologies, referred to as a HyperX topology, has at least the following properties:

(1) The nodes (e.g., network nodes, such as switches, bridges, routers, etc.) used to implement the topology all have the same radix, R (i.e., the total number of ports per node is R). If the total number of terminal devices, N, to be interconnected is less than or equal to the radix, R, then all of the terminal devices can be interconnected using a single node. However, if the total number of terminal devices exceeds the radix, R, then multiple nodes are needed to interconnect all of the terminal devices (with an associated number of network hops).

(2) For each node, a fixed number of ports, T, are reserved for interconnection with up to a respective T terminal devices per node (out of the total number of terminals, N), thereby leaving each node with R-T ports for interconnecting with other nodes to form the network topology.

(3) Nodes are interconnected in multiple dimensions, with the number of dimensions represented by the variable L. For example, the nodes can be viewed logically (although not necessarily physically) as being points in an L-dimensional integer lattice or array. Each node is identified by a coordinate vector (also referred to as a coordinate address, a multi-index, etc.) having a set of coordinate values, with each coordinate value representing a position (e.g., address) of the node in a respective dimension of the L-dimensional topology. In an example, for an L-dimensional topology, the coordinate vector is given by $I=(I_1, \ldots, I_L)$ where, for $k=1, \ldots, L$, the value $I_k$ represents the coordinate value (address) of the associated node in the $k^{th}$ dimension, and $I_k$ ranges from $0 \leq I_k < S_k$, where $S_k$ represents the extent (e.g., number of nodes) of the topology in the $k^{th}$ dimension.

(4) Each node in the topology is fully connected (e.g., all-to-all connected) with all its neighbor nodes in each dimension of the multidimensional network topology. In general, a node can have one or more neighbor nodes in each dimension of the multidimensional network topology. In an example, two nodes are neighbor nodes in a particular dimension of the topology when each coordinate value of a first coordinate vector identifying the first node equals each respective coordinate value of a second coordinate vector identifying the second node for every dimension of the multidimensional network topology except the particular dimension along which the two nodes are neighbors. As such, a complete set of neighbor nodes along a particular (e.g., first) dimension all have equal coordinate vectors (or addresses, multi-indices, etc.) for all other (e.g., second, third, etc.) dimensions except the particular (e.g., first) dimension. Thus, in this example, a particular node is fully (e.g., all-to-all) connected with all neighbor nodes in each dimension of the multidimensional network topology when the node is connected to each other node in the topology identified by a respective coordinate vector equaling the particular node's coordinate vector for every dimension of the multidimensional network topology except one dimension Based on the foregoing properties, a multidimensional network topology belonging to the HyperX class of topologies described herein can be specified by at least the following parameters:

(1) The radix per node, R.

(2) The number of terminal devices per node, T.

(3) An extent vector, $S=(S_1, \ldots, S_L)$, containing an extent value, $S_k$, for each dimension of the topology, with the extent value, $S_k$, representing the extent (e.g., number of nodes) of the topology in the $k^{th}$ dimension.

(4) Additionally, trunking may be used in which neighbor nodes in a particular dimension are interconnected by more than one link (e.g., to increase the connection bandwidth between these nodes). In such examples, the topology is also specified by a trunking factor vector, $K=(K_1, \ldots, K_L)$, containing a trunking factor, $K_k$, for each dimension of the topology, with the trunking factor, $K_k$, representing the number of links between neighbor nodes in the $k^{th}$ dimension.

The network topology 100 of FIG. 1 corresponds to an example multidimensional HyperX topology containing 30 nodes (represented by circles labeled with the letter "R") interconnecting a set of terminals (represented by circles labeled with the letter "T"). The nodes of the network topology 100 are arranged logically in a 5×3×2 lattice and, thus, the extent vector representing the network topology is $S=(S_1=5, S_2=3, S_3=2)=(5,3,2)$. In the illustrated example, each node R is labeled with its respective coordinate vector $I=(I_1, I_2, I_3)$, which has three coordinate values, $I_1=\{0,1,2,3,4\}$, $I_2=\{0,1,2\}$, $I_3=\{0,1\}$, one value for each dimension. The coordinate values in each dimension range over the extent of the network topology 100 in that dimension.

The network topology 100 is a HyperX topology and, thus, each node R in the network topology 100 is fully connected (e.g., all-to-all connected) with all its neighbor nodes in each of the three (3) dimensions of the topology. To simplify depiction of the network topology 100 of FIG. 1, the complete set of links fully connecting neighbor nodes is illustrated only for node 105 having coordinate vector I=(4,0,0). Based on the definitions of neighbor nodes provided above, the neighbor nodes of the node 105 in a first dimension of the network topology 100 are nodes 110, 115, 120 and 125 (e.g., because the coordinate vectors for the nodes 105, 110, 115, 120 and 125 are the same except for the first dimension). The neighbor nodes of the node 105 in a second dimension are nodes 130 and 135 (e.g., because the coordinate vectors for the nodes 105, 130 and 135 are the same except for the second dimension). The neighbor node of the node 105 in a third dimension is node 140 (e.g., because the coordinate vectors for the nodes 105 and 140 are the same except for the third dimension).

To further simplify depiction of the network topology 100 of FIG. 1, although each node R has the same radix and can connect to the same number of terminal devices, only the four (4) terminal devices 150, 155, 160 and 165 that connect to node 105 having coordinate vector I=(4,0,0) are illustrated. However, each of the other nodes in the network topology 100 can also be connected to up to a respective four (4) terminals, but these terminal devices are not shown to improve the readability of FIG. 1. Thus, the network topology 100 can interconnect up to 30×4=120 terminal devices using the 30 nodes. Furthermore, because each node connects with four (4) neighbor nodes in the first dimension, two (2) neighbor nodes in the second dimension, one (1) neighbor node in the third dimension, and up to four (4) terminal devices, the minimum radix for each node is R=4+2+1+4=11.

Figure 2:
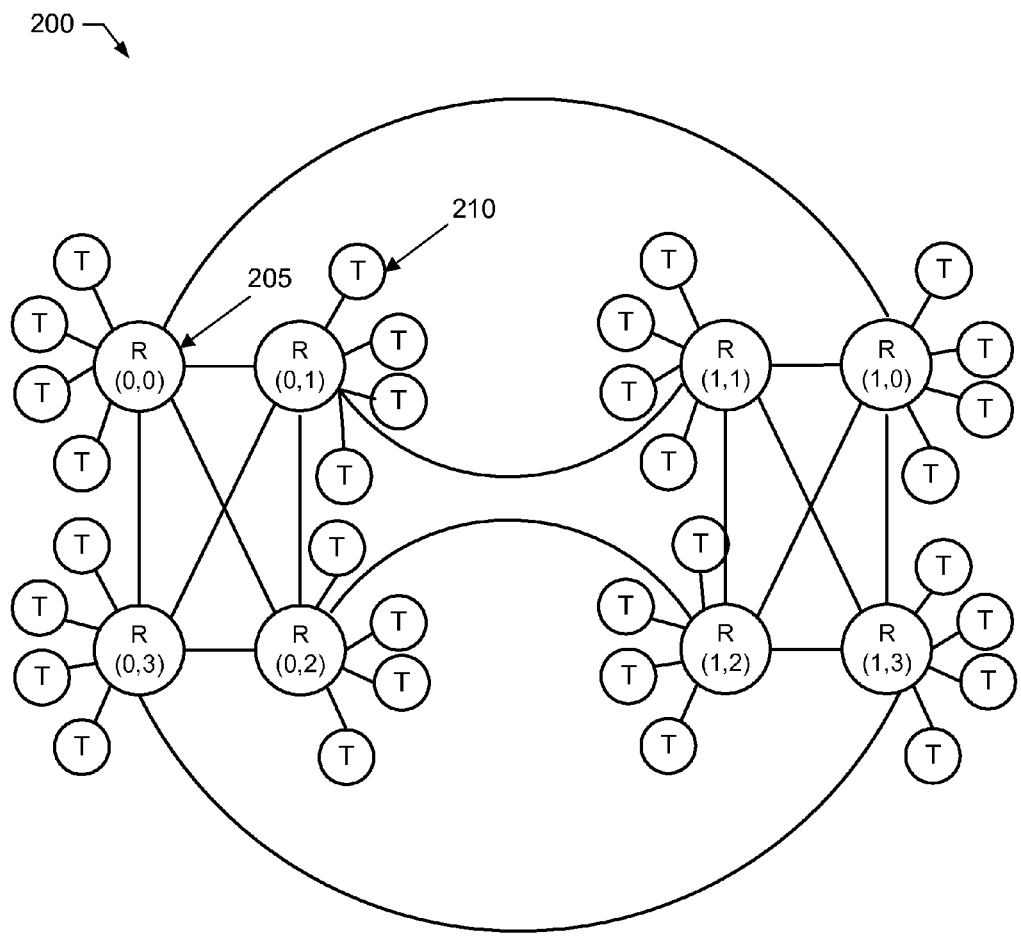
FIG. 2 is block diagram of a second example multidimensional network topology that may be determined by the methods and apparatus disclosed herein.

Another example multidimensional network topology 200 of the HyperX class of topologies capable of being determined and implemented using the example techniques disclosed herein is illustrated in FIG. 2. The network topology 200 is characterized by the following parameters: a dimensionality given by L=2; a radix per node 205 given by R=8; a number of terminal devices 210 per node 205 given by T=4; and an extent vector given by $S=(S_1=2, S_2=4)$. The network topology 200 illustrates the four (4) terminal devices 210 connected to each node 205, as well as the all-to-all connection between neighbor nodes. As shown in FIG. 2, the total number of nodes is 2×4=8 interconnecting a total of 4×8=32 terminal devices.

Figure 3:
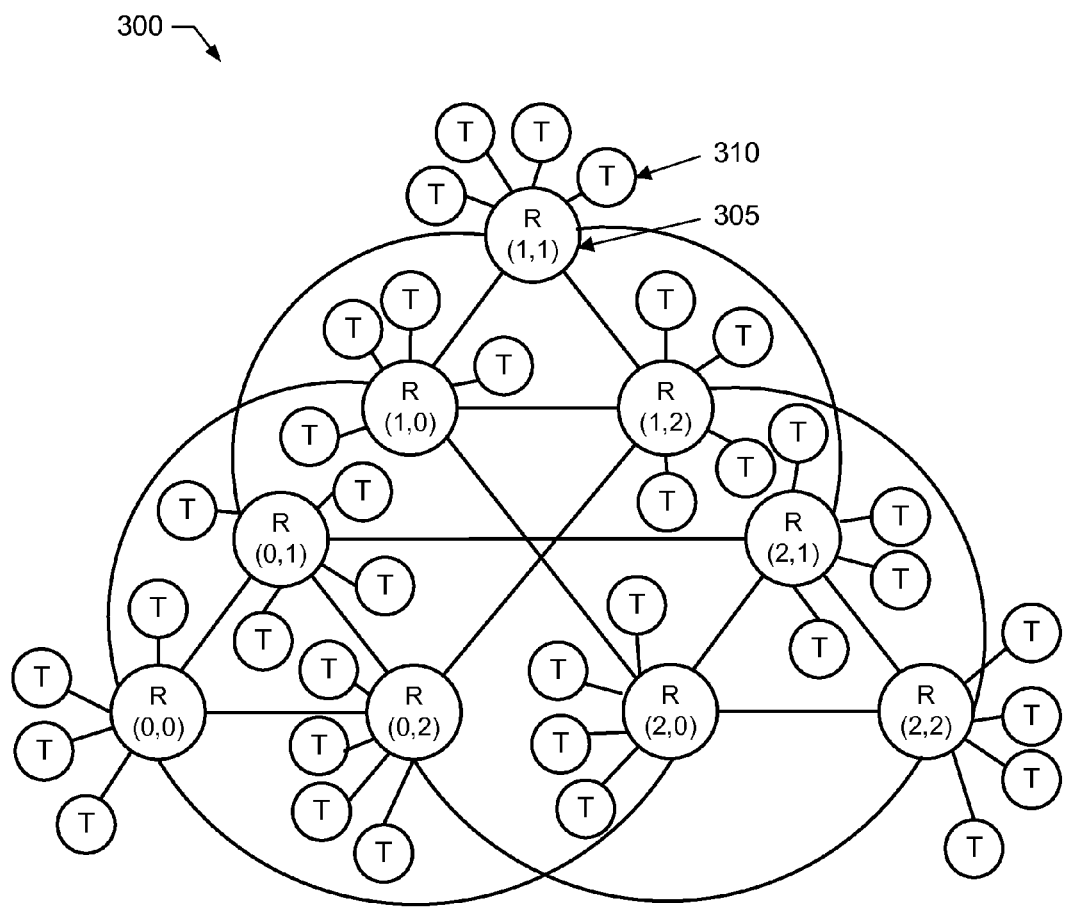
FIG. 3 is block diagram of a third example multidimensional network topology that may be determined by the methods and apparatus disclosed herein.

FIG. 3 illustrates another example multidimensional network topology 300 of the HyperX class of topologies capable of being determined and implemented using the example techniques disclosed herein. The network topology 300 is referred to as a regular HyperX topology because the extent value (e.g., number of nodes), $S_k$, in each dimension is the same. A regular HyperX topology can be viewed as the topology of the set of strings of length L over an alphabet of size S in which two strings are viewed as neighbors if they differ in one position. Such regular HyperX topologies are also known in graph theory as Hamming Graphs. In the illustrated example of FIG. 3, the network topology 300 is characterized by the following parameters: a dimensionality given by L=2; a radix per node 305 given by R=8; a number of terminal devices 310 per node 305 given by T=4; and an extent vector given by $S=(S_1=3, S_2=3)$. The network topology 300 illustrates the four (4) terminal devices 310 connected to each node 305, as well as the all-to-all connection between neighbor nodes. As shown in FIG. 3, the total number of nodes is 3×3=9 interconnecting a total of 4×9=36 terminal devices.

An example topology development system 400 that can be used to determine and implement multidimensional HyperX network topologies, such as the topologies 100, 200 and 300 described above, is illustrated in FIG. 4. The topology development system 400 includes an example topology determination module 405, an example topology implementation module 410 and an example terminal 415. In the illustrated example, the terminal 415 provides inputs to and receives outputs from the topology determination module 405 and the topology implementation module 410. The terminal 415 can be implemented by any type of terminal or user input/output (I/O) device, such as a personal computer, a personal digital assistant (PDA), a smartphone, etc.

In the illustrated example, the topology determination module 405 includes an example parameter input module 420 to receive one or more input parameters from the terminal 415. The input parameter(s) received by the parameter input module 420 are used by the topology determination module 405 to determine a set of multidimensional HyperX network topologies satisfying one or more constraints based on the received input parameter(s). The determined set of multidimensional HyperX network topologies can include zero, one or more topologies. Examples of input parameters that can be received by the parameter input module 420 for determining the set of multidimensional HyperX network topologies include, but are not limited to, any, some or all of the following input parameters:

(1) A total number of terminal devices, N, to be interconnected by the topology;

(2) A specified radix, R, for each node to be used to interconnect the terminal devices in the topology; and/or (3) A bisection bandwidth, B, specified as a fraction of a maximum possible bandwidth.

Bisection bandwidth measures the ability of a network topology to handle traffic generated by the terminal devices in a multidimensional network topology. An example procedure for determining the bisection bandwidth of a particular multidimensional topology involves bisecting (e.g., splitting) the topology into two subnetworks, each containing half of the terminal nodes, and then counting the number of links that connect the two subnetworks. The bisection (e.g., split) yielding the fewest links connecting the resulting two subnetworks yields the bisection bandwidth of the multidimensional network topology.

For example, with reference to FIG. 1, the bisection bandwidth for the network topology 100 is determined by bisecting the topology along the third (e.g., smallest) dimension corresponding to the third coordinate value of each node's coordinate vector (e.g., address). In this bisection, all nodes having a coordinate vector ending with a zero (0) are considered to be in one subnetwork, all nodes having a coordinate vector ending with a one (1) are considered to be in the other subnetwork, and there are a total of 15 links interconnecting the two subnetworks. If all 60 terminals in one subnetwork communicate with all 60 terminals in the other subnetwork, then the throughput is limited to $15/60=1/4$ of a maximum bandwidth that would be possible if there were a sufficient number of links (e.g., 60) to fully interconnect the two subnetworks. As such, the bisection bandwidth fraction for the network topology 100 is ¼.

Trunking can be used to increase the bisection bandwidth of a multidimensional network topology. For example, in the network topology 100, a trunking factor of one (1) is used in each dimension. If the trunking factor in the third (e.g., smallest) dimension was increased to three (3), then there would be a total of 45 links interconnecting the two subnetworks formed by bisecting the third dimension of the network, resulting in a bandwidth fraction for the third dimension of $45/60=3/4$. However, the bisection of the network topology 100 along the second dimension corresponding to the second coordinate value of each node's coordinate vector (e.g., address) results in 20 links interconnecting the two subnetworks (because bisecting the network along the second dimension results in 20 nodes in one subnetwork (e.g., corresponding to $I_2=\{0,1\}$) and 10 nodes in the other subnetwork (e.g., corresponding to $I_2=\{2\}$), with 20 links interconnecting the two subnetworks). The greatest traffic capable of being generated by such a bisection would occur if all 40 terminals connected to the 10 nodes in the 10-node network generated traffic simultaneously, resulting in a bandwidth fraction for the second dimensions of 20 links/40 terminals=½. As such, in this example with a trunking factor of 3 in the third dimension, the network topology 100 would have a bisection bandwidth fraction of 20/40=½, determined by bisecting the second dimension.

The topology determination module 405 includes an example constraint evaluation module 425 to evaluate whether a particular multidimensional HyperX network topology satisfies one or more constraints based on the received input parameter(s). Examples of constraints that can be evaluated by the constraint evaluation module 425 for a particular multidimensional HyperX network topology include, but are not limited to, any, some or all of the following constraints:

(1) A network size constraint requiring that the topology includes a number of nodes and a respective number of devices interconnected with each node capable of supporting the total number of devices, N, input parameter. Mathematically, the network size constraint is given by Equation 1:

$$T\prod_{i=1}^{L} S_i \geq N \qquad \text{Equation 1}$$

(2) A node port constraint requiring that the topology includes a number of nodes and a respective number of devices interconnected with each node such that each node has a number of ports no greater than the radix, R, input parameter. Mathematically, the node port constraint is given by Equation 2:

$$T + \sum_{i=1}^{L} K_i(S_i - 1) \leq R \qquad \text{Equation 2}$$

Equation 2 is determined by noting that the number of links used to fully connect a node to all other neighbor nodes in the ith dimension is $K_i(S_i-1)$.

(3) A bisection bandwidth constraint requiring that the topology includes a number of nodes and a respective number of devices interconnected with each node such that the network topology has a bisection bandwidth satisfying at least the bisection bandwidth factor, B, input parameter. Mathematically, the bisection bandwidth constraint is given by Equation 3:

$$\min_i(K_i S_i) \geq 2TB \qquad \text{Equation 3}$$

For example, in the example network topology 100 of FIG. 1, $K_i=1$ for $i=\{1,2,3\}$, the minimum $S_i$ is $S_3=2$, and $T=4$. In this example, Equation 3 yields a bisection bandwidth of $B \leq \min_i (K_i S_i)/2T=(1\times2)/(2\times4)=¼$, as expected.

In an example, the topology determination module 405 considers a search space of possible multidimensional HyperX network topologies (also referred to as candidate multidimensional HyperX network topologies) and employs the constraint evaluation module 425 to evaluate the network size constraint of Equation 1, the node port constraint of Equation 2 and the bisection bandwidth constraint of Equation 3 to determine whether a possible multidimensional HyperX network topology in the search space supports the input parameter(s) received by the parameter input module 420. To prune the search space and thereby reduce the number of possible multidimensional HyperX network topologies to be considered by the topology determination module 405, additional constraints can be evaluated by the constraint evaluation module 425 to reject possible topologies from the search space (e.g., such as topologies that that are clearly not feasible given the received input parameters). For example, some additional constraints include, but are not limited to, any, some or all of the following:

(4) A dimension ordering constraint which, for convenience, restricts the topology search space to topologies having dimensions that are ordered by increasing extent size. Mathematically, the dimension ordering constraint is given by Equation 4:

$$S_1 \leq S_2 \leq \ldots \leq S_L \qquad \text{Equation 4}$$

(5) A trunking factor ordering constraint derived by noting that, because the bisection bandwidth constraint depends on the smallest value of $K_i S_i$ (trunking factor multiplied by extent size in terms of number of nodes) across all dimensions, and the dimensions are to be ordered by increasing extent according to Equation 4, then the trunking factors will be ordered by decreasing extent size. Mathematically, the trunking factor ordering constraint is given by Equation 5:

$$K_1 \geq K_2 \geq \ldots K_L \qquad \text{Equation 5}$$

(6) A nontrivial dimension constraint requiring that each dimension of the topology actually exists. Mathematically, the nontrivial dimension constraint is given by Equation 6:

$$S_i \geq 2, \forall i \qquad \text{Equation 6}$$

(7) A terminal connection constraint requiring that each node connects to at least one terminal device. Mathematically, the terminal connection constraint is given by Equation 7:

$$T \geq 1 \qquad \text{Equation 7}$$

(8) A dimensionality constraint, determined by combining the node port constraint of Equation 2, the trunking factor constraint of Equation 5, the nontrivial dimension constraint of Equation 6 and the terminal connection constraint of Equation 7, which requires that the number of dimensions cannot exceed one less than the specified switch radix. Mathematically, the dimensionality constraint is given by Equation 8:

$$1 \leq L \leq R-1 \qquad \text{Equation 8}$$

In the illustrated example, the topology determination module 405 also includes an example topology selection module 430 to select a particular topology from the set of multidimensional HyperX network topologies satisfying any, some or all of the preceding constraints. In such an example, the constraint evaluation module 425 also evaluates one or more selection constraints, in addition to the preceding constraints, to determine the set of multidimensional HyperX network topologies. In this way, the determined set of multidimensional HyperX network topologies includes only those topologies satisfying the above constraints that are based on the input parameters (also referred to as the input constraints), as well as the additional selection constraint(s). The topology selection module 430 can then select a particular topology from this determined set of multidimensional HyperX network topologies (which may contain zero, one or more topologies) with the knowledge that every topology in the set satisfies the input constraints and the selection constraints. The particular selection constraint(s) to be used for topology selection may be specified by the terminal 415. Examples of selection constraints include optimization constraints, such as a minimum node constraint requiring the selected topology to have a minimum number of nodes relative to all other topologies satisfying the input constraints. Other selection constraints include implementation constraints requiring the selected topology to have certain implementation characteristics, such as a maximum number of dimensions, a maximum extent in any dimension or a particular one of the dimensions, etc.

If, for example, the topology determination module 405 supports the minimum node constraint, the constraint evaluation module 425 can be configured to evaluate any or all of the following selection constraints in addition to the eight (8) input constraints described above:

(9) A node count reduction constraint requiring that, for a possible topology to be included in the set of multidimensional HyperX network topologies, the number of nodes in the possible topology is to be less than or equal to the minimum number of nodes in any topology considered so far. Mathematically, the node count reduction constraint is given by Equation 9:

$$\prod_{i=1}^{L} S_i \leq O \qquad \text{Equation 9}$$

where $\Pi_{i=1}^{L}=S_i$ represents the number of nodes in the topology under examination (e.g., determined by multiplying the extent of the topology in each dimension), and O represents the minimum number of nodes in any topology considered so far.

(10) A minimum number of terminal devices constraint, which is determined by realizing that, if the number of nodes in a topology satisfies the node count reduction constraint of Equation 9, then the number of terminal devices T connected to each node needs to be sufficiently large to yield the total number of nodes, N, specified as an input parameter. Mathematically, the minimum number of terminal devices constraint is given by Equation 10:

$$T \geq N/O \qquad \text{Equation 10}$$

To efficiently process the search space of possible multidimensional HyperX network topologies to examine for inclusion in the set of topologies satisfying the input parameter and selection constraints, the topology determination module 405 of the illustrated example includes an example topology iteration module 435. In an example, the topology iteration module 435 processes the search space of possible topologies using an outer loop procedure and an inner loop procedure. In such an example, the topology iteration module 435 uses the outer loop procedure to search over the set of possible dimensions, L, as determined by the dimensionality constraint of Equation 8.

Next, for a fixed dimensionality (L) selected for examination by the outer loop procedure, the topology iteration module 435 uses the inner loop procedure to examine the set of possible topologies having extent vectors, S, with the selected dimensionality (L) and that satisfy the input and selection constraints. In an example, due to the dimension ordering constraint of Equation 4, the topology iteration module 435 iterates over the set of candidate topologies having the selected dimensionality (L) by incrementing the extent vector, S, lexicographically, in which the extent value, $S_L$, corresponding to the highest dimension is incremented the fastest, followed by the extent value, $S_{L-1}$, for the next highest dimension, and so forth, with the extent value, $S_1$, corresponding to the lowest dimension being incremented the slowest.

In an example of lexicographically incrementing the extent vector, S, the topology iteration module 435 begins with all extent values of the extent vector, S, being set to two (2) (based on the dimension ordering constraint of Equation 4 and the nontrivial dimension constraint of Equation 6). The extent value, $S_L$, corresponding to the highest dimension is then incremented at the next iteration of the inner loop procedure. For each subsequent iteration, only one extent value, $S_i$, in the extent vector is incremented in the following manner. For the extent value currently being incremented (e.g., beginning with the extent value, $S_L$, corresponding to the highest dimension), on each subsequent iteration only that same extent value is incremented from a minimum constrained value to a maximum constrained value. The minimum constrained value is given by a combination of the $S_1 \geq 2$ and $S_i \geq S_{i-1}$ constraints (from the dimension ordering constraint of Equation 4 and the nontrivial dimension constraint of Equation 6). The maximum constrained value for a particular extent value, $S_i$, can be determined from: (i) the node port constraint of Equation 2, evaluated using the current lower bound on the number of terminal devices per node (e.g., from the terminal connection constraint of Equation 7 or the minimum number of terminal devices constraint of Equation 10), (ii) the fact that the trunking factor, $K_i$, for a given dimension is at least one (1), and (iii) the known values of the preceding extent value, $(S_1, \ldots, S_{i-1})$, in the extent vector S. The minimum and/or maximum constrained values for each extent value may change after each iteration according to the aforementioned constraints. For example, when the extent value, $S_i$, for a particular dimension reaches its maximum constrained value for the current iteration, at the next iteration of the inner loop procedure, the topology iteration module 435 increments the extent value, $S_{i-1}$, for the preceding dimension by one (1) and resets the extent value for the subsequent dimensions, $(S_i, \ldots, S_L)$ to the same value as the extent value; $S_{i-1}$ (to ensure that the dimension ordering constraint of Equation 4 is satisfied). The inner loop procedure terminates when incrementing the extent value, $S_1$, for the first dimension results in an extent vector, S, that is equal in all dimensions and that cannot be feasible under the input parameter and selection constraints.

As an illustrative example, in a two-dimensional HyperX network topology where the extent value of the second dimension (e.g., after any re-ordering per the dimension ordering constraint of Equation 4) has a maximum constrained value of $S_2 \leq 5$, the topology iteration module 435 may iterate the extent vector, S, lexicographically as follows:
 Iteration 1: S=(2,2);
 Iteration 2: S=(2,3);
 Iteration 3: S=(2,4);
 Iteration 4: S=(2,5);
 Iteration 5: S=(3,3);
 Iteration 6: S=(3,4), and so on.

As another example, in a three-dimensional HyperX network topology where the extent value of the third dimension (e.g., after any re-ordering per the dimension ordering constraint of Equation 4) has a maximum constrained value of $S_2 \leq 4$, the topology iteration module 435 may iterate the extent vector, S, lexicographically as follows:
 Iteration 1: S=(2,2,2);
 Iteration 2: S=(2,2,3);
 Iteration 3: S=(2,2,4);
 Iteration 4: S=(2,3,3);
 Iteration 5: S=(2,3,4);
 Iteration 6: S=(2,4,4);

Iteration 7: S=(3,3,3);
Iteration 8: S=(3,3,4);
Iteration 9: S=(3,4,4); and
Iteration 10: S=(4,4,4).

After the topology iteration module 435 iterates over the search space of possible multidimensional HyperX network topologies, the constraint evaluation module 425 determines which possible topologies are to be included in the set of topologies satisfying the input parameter and selection constraints. An example topology output module 440 included in the topology determination module 405 outputs the determined set of topologies in any appropriate format (such as one or more data files to be displayed via the terminal 415 and/or provided to the topology implementation module 410 for subsequent processing). Additionally or alternatively, the topology output module 440 can output a particular topology from the set of topologies satisfying the input parameter and selection constraints as selected by the topology selection module 430. For example, the topology selection module 430 can employ any selection procedure to select a particular topology from the set, such as implementing an automated selection procedure based on predefined rules, accepting a selection from a user via the terminal 415, etc. As described above, each topology output by the topology output module 440 can be uniquely specified by its radix per node (R), number of terminal devices per node (T), its extent vector (S=($S_1$, . . . , $S_L$)) and its trunking factor vector, K=($K_1$, . . . , $K_L$). Accordingly, the topology output module 440 can output a topology represented as the triplet <K, S, T>, with the radix per node (R) then being determinable from the triplet using the node port constraint given by Equation 2.

The topology determination module 405 also includes an example storage unit 445. The storage unit 445 can be used to store the input parameter(s) received by the parameter input module 420, topology descriptions (<K, S, T>) for each topology in the set determined by the constraint evaluation module 425 and/or for the particular topology selected by the topology selection module 430, etc. The storage unit 445 can be implemented by any storage or memory technology, such as the mass storage device 1030 and/or the volatile memory 1018 included in the processing system 1000 described in greater detail below.

Figure 4:
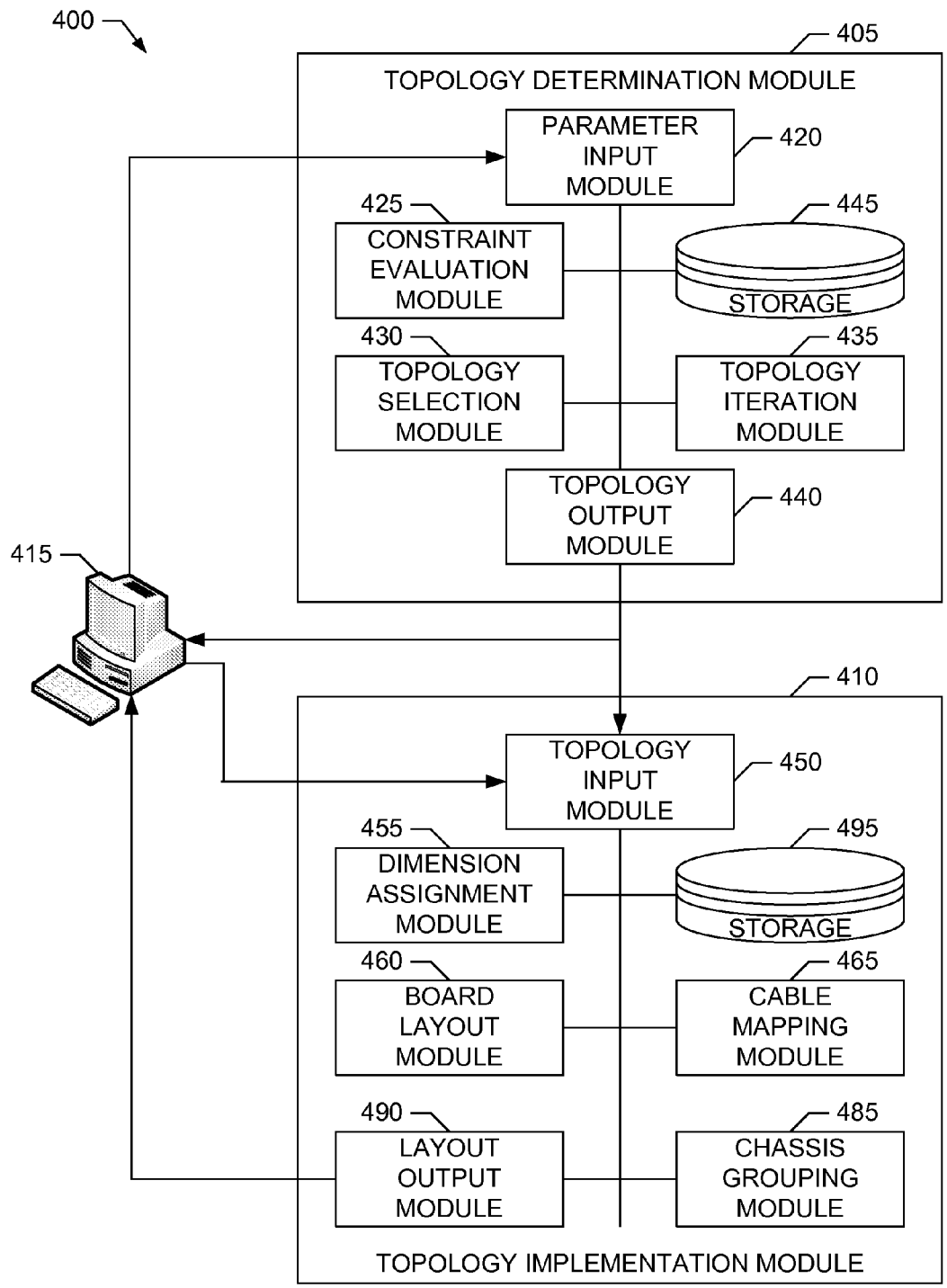
FIG. 4 is a block diagram of an example topology development system that may implement the methods and apparatus disclosed herein to determine and/or implement multidimensional network topologies, such as the first, second and/or third example multidimensional network topologies illustrated in FIGS. 1-3.

The topology development system 400 of FIG. 4 also includes the topology implementation module 410 to implement a particular multidimensional HyperX network topology output by the topology determination module 405. In the illustrated example, the topology implementation module 410 is used to implement network topologies in a hierarchical arrangement such that each node and the terminal devices coupled to the node are all included on a single printed circuit board. The printed circuit boards for multiple nodes are grouped together for interconnection in a chassis, and multiple chassis are grouped in an array (e.g., such as a two-dimensional array) that facilitates interconnection using ribbon cables, thereby reducing the number of discrete cable connections required to implement the multidimensional network topology. The grouping of nodes into a chassis and the grouping of multiple chassis into an array is based on treating each dimension of the topology as a different hierarchical level. In this way, the topology implementation module 410 determines board layouts, cable mappings and chassis groupings to implement a particular multidimensional HyperX network topology.

In the illustrated example, the topology implementation module 410 includes an example topology input module 450 to accept an input topology description (e.g., in the form of the triplet <K, S, T>) for a particular multidimensional HyperX network topology to be implemented (e.g., as determined by the topology determination module 405). An example dimension assignment module 455 included in the topology implementation module 410 divides the nodes included in the input topology into groups of nodes to be fully connected along a first level dimension of the topology. Each group of nodes that are fully connected along the first level dimension will be included in a respective chassis in the implemented topology. For example, with reference to the network topology 100 of FIG. 1, the dimension assignment module 455 may assign the first dimension of the network topology 100 to be the first level dimension for implementation and, thus, include each set of five (5) fully (all-to-all) connected nodes along the first dimension in a respective chassis in the implemented topology.

The topology implementation module 410 includes an example board layout module 460 to determine a backplane layout to fully interconnect each group of nodes in a chassis dedicated to that group of nodes. For example, as mentioned above, each node and the terminal devices coupled to the node are all included on a single printed circuit board. The printed circuit boards containing the nodes in a particular group are inserted in a chassis having a backplane to fully interconnect the nodes on each board (to provide all-to-all connection along the first level dimension selected by the assignment module). In such an example, the board layout module 460 assigns boards to chassis and determines a layout for the chassis backplane to fully interconnect (e.g., bidirectionally) the boards contained in a particular chassis.

The topology implementation module 410 also includes an example cable mapping module 465 to determine a ribbon cable mapping for each dimension of the multidimensional network topology other than the first level dimension to fully connect each group of nodes contained in each chassis with the neighbor nodes along the other, higher level dimensions. These neighbor nodes along dimensions other than the first level dimension are included on respective boards contained in one or more other chassis. The dimension assignment module 455 assigns each additional dimension of the topology a respective, higher hierarchical level. Then, for each group of nodes contained in each chassis and for each higher level dimension, the cable mapping module 465 determines the connections (e.g., bidirectional) needed to fully interconnect the group of nodes in the particular chassis with neighbor nodes along the particular higher level dimension that are contained in other chassis.

In an example, the dimensions of the topology assigned by the dimension assignment module 455 to the first and higher level dimensions for implementation can be specified by user inputs received via the topology input module 450. In another example, the topology implementation module 410 may iteratively examine each permutation of assigning dimensions of the topology to different dimension levels and select a particular resulting implementation based on one or more criteria, such as selecting the implementation that yields the fewest number of chassis, the smallest or largest chassis, the fewest number of external ribbon cable connections, etc.

Optical fiber technologies, such as parallel ribbon fibers and photonic crystal fibers (PCF), allow many optical connections to be made in parallel, which can simplify installation. However, these and other types of ribbon cable technologies are generally useful only when large numbers of connections are needed from one point to another point in an implementation. The cable mapping module 465 determines cable mappings that are amenable to using ribbon cables to connect the multiple chassis to form the overall implementation, rather than using individual "spaghetti-like" cable connections to interconnect chassis in an ad-hoc fashion.

For example, with reference to the network topology 100 of FIG. 1, the dimension assignment module 455 may assign the second dimension of the network topology 100 to be the second level dimension for implementation, and the third dimension of the network topology 100 to be the third level dimension for implementation. In this example, the dimension assignment module 455 already assigned (as described above) the first dimension of the topology to be the first level dimension when groups of nodes were determined for inclusion in each chassis (e.g., as described above). Under such an assignment, each group of five (5) nodes 470, 472, 474, 476, 478 and 480 (depicted logically as respective columns of nodes) are fully connected along the first level dimension and, thus, are included in respective separate chassis. Thus, in this example, there would be six (6) chassis in total, each chassis containing a respective one of the node groups 470, 472, 474, 476, 478 and 480, with the 5 nodes in a group included on respective boards interconnected by a backplane determined by the board layout module 460.

Continuing with this example, to interconnect neighbor nodes in different chassis, the cable mapping module 465 determines a second level cable mapping to fully interconnect chassis along the second level dimension (e.g., the second dimension of the network layout 100) and a third level cable mapping to fully interconnect chassis along the third level dimension (e.g., the third dimension of the network layout 100). For example, for the chassis containing the node group 470, the cable mapping module 465 determines a second level cable mapping to assign individual cables in a first ribbon cable to interconnect the nodes in the node group 470 with respective second dimension neighbor nodes in the node group 472, which are contained in a separate chassis. Similarly, the cable mapping module 465 determines a second level cable mapping to assign individual cables in a second ribbon cable to interconnect the nodes in the node group 470 with the second dimension neighbor nodes in the node group 474, which are contained in a different, separate chassis. In this way, a single ribbon cable can be used to fully interconnect node group 470 with node group 472 along the second level dimension, and another ribbon cable can be used to fully interconnect node group 470 with node group 474 also along the second level dimension. The cable mapping module 465 repeats this process for each chassis containing a respective one of the node groups 470-480 to determine a complete set of second level cable mappings to fully interconnect all chassis (and, thus, the node groups 470-480) along the second level dimension.

Continuing with this example, the cable mapping module 465 performs a similar procedure to determine a complete set of third level cable mappings to fully interconnect all chassis (and, thus, the node groups 470-480) along the third level dimension (e.g., the third dimension of the network topology 100). For example, for the chassis containing the node group 470, the cable mapping module 465 determines a third level cable mapping to assign individual cables in a third ribbon cable to interconnect the nodes in the node group 470 with respective third dimension neighbor nodes in the node group 476, which are contained in yet another separate chassis. In this way, a single ribbon cable can be used to fully interconnect node group 470 with node group 476 along the third level dimension. The cable mapping module 465 repeats this process for each chassis containing a respective one of the node groups 470-480 to determine the complete set of third level cable mappings to fully interconnect all chassis (and, thus, the node groups 470-480) along the third level dimension. As a result, the cable mapping module 465 determines a cable mapping having three ribbon cables per chassis for each chassis containing a respective one of the node groups 470-480, with two ribbon cables implementing the second level interconnections, and one ribbon cable implementing the third level interconnections.

To determine a chassis arrangement for interconnecting the chassis containing each group of nodes using ribbon cables implemented according to the cable mappings determined by the cable mapping module 465, the topology implementation module 410 further includes an example chassis grouping module 485. In an example, the chassis grouping module 485 determines a pattern (e.g., such as a two-dimensional array) for arranging the chassis containing respective groups of nodes to maintain regularity of the lengths of the ribbon cables. For example, with reference to the network topology 100 of FIG. 1, the chassis grouping module 485 can arrange each chassis containing a respective one of the node groups 470-480 in a two-dimensional array such that the chassis containing node groups 470, 472 and 474 are in a first row of the array, and the chassis containing node groups 476, 478 and 480 are in a second row of the array.

An example layout output module 490 is included in the topology implementation module 410 to output the determined dimension assignments, board and backplane outputs, cable mapping and chassis groupings to the terminal 415. For example, the layout output module 490 may output such implementation information in the form of data files, such as netlists, layout files, spreadsheets, etc., that can be used to create the boards, backplanes, chassis and ribbon cables for implementing the input topology description received by the topology input module 450.

The topology implementation module 410 also includes an example storage unit 495. The storage unit 495 can be used to store the input topology description (<K, S, T>) received by the topology input module 405 and/or the determined dimension assignments, board and backplane outputs, cable mapping and chassis groupings to be output by the layout output module 490, etc. The storage unit 495 can be implemented by any storage or memory technology, such as the mass storage device 1030 and/or the volatile memory 1018 included in the processing system 1000 described in greater detail below.

Figure 5:
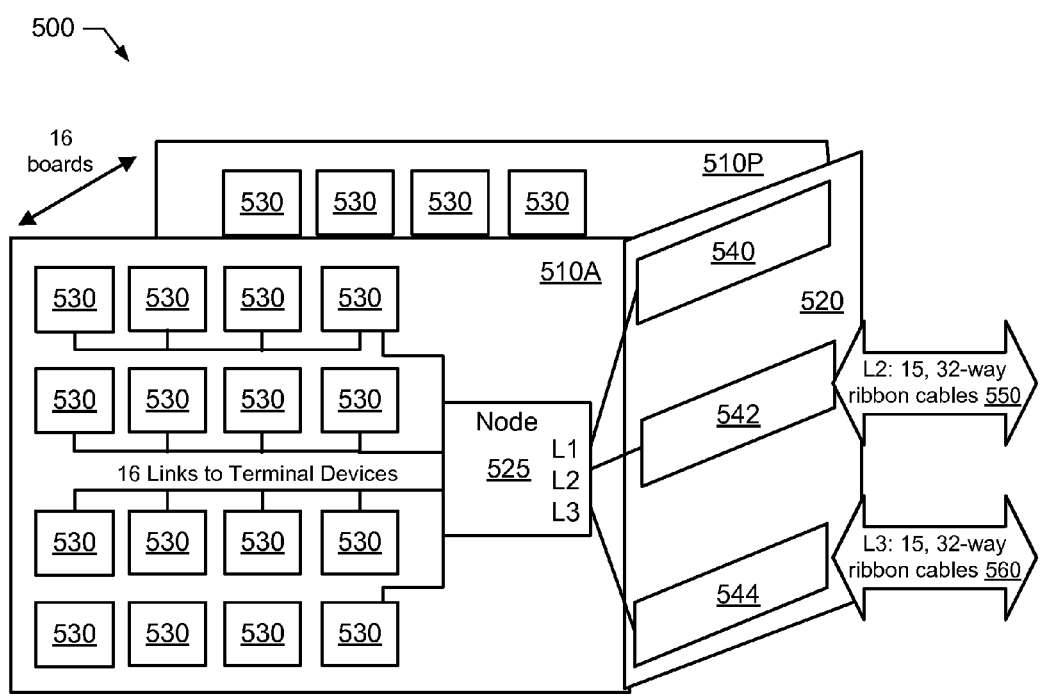
FIG. 5 is a block diagram of an example board level layout and ribbon cable mapping that may be determined by the topology development system of FIG. 4.
Figure 6:
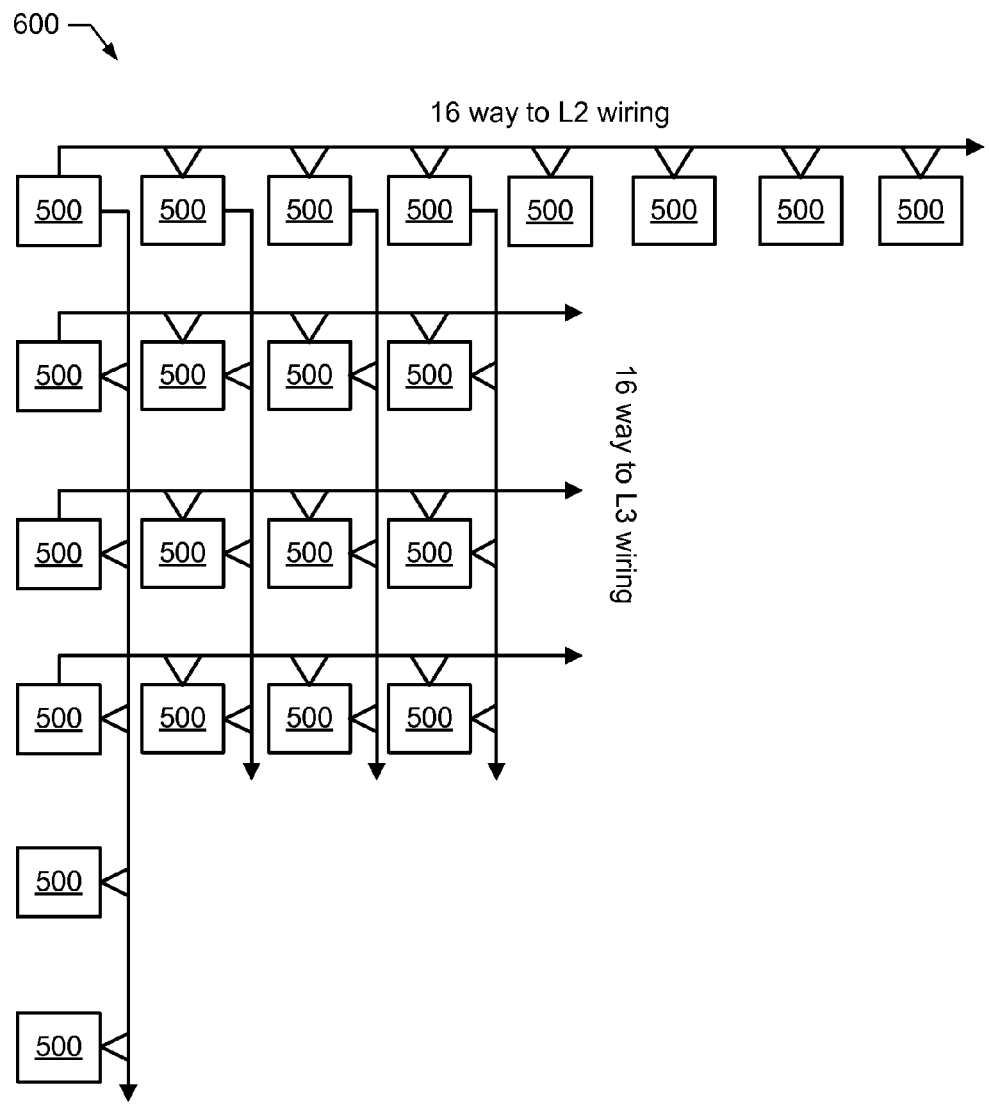
FIG. 6 is a block diagram of an example chassis grouping that may be determined by the topology development system of FIG. 4.

Implementation of another example multidimensional HyperX network topology by the topology implementation module 410 is illustrated in FIGS. 5-6. The example implementation illustrated in FIGS. 5-6 corresponds to a regular, L=3 dimensional HyperX topology with extent vector S=(16, 16, 16), T=16 terminals per node, and a minimum radix per node of R=16+3×15=61. In this example topology, there are 4096×3×15=184,320 links or connections between nodes, as each connection is bidirectional and, thus, can convey signals in each direction.

Example existing fiber ribbon cables contain a number of single or multimode fibers terminated with connectors on each end of the fibers. In the illustrated example of FIGS. 5-6, 32-way fiber ribbon cables are used to interconnect groups of nodes contained in different chassis.

Turning to the figures, FIG. 5 illustrates an example chassis 500 including board layouts and cable mappings determined by the topology implementation module 410 for the example network topology having extent vector S=(16, 16, 16), T=16 terminals per node, and a minimum radix per node of R=16+3×15=61. FIG. 6 illustrates an example chassis grouping 600 determined by the topology implementation module 410 for this example network topology. The chassis 500 of FIG. 5 includes a set of 16 example printed circuit boards (PCBs) labeled 510A-P connected to an example backplane 520.

Each PCB 510A-P includes a respective node 525 to be fully interconnected along a first level dimension of the topology. As such, a total of 16×16=256 of the chassis 500 are needed to implement this example network topology. In the illustrated example, each PCB 510A-P also includes a respective 16 terminal devices 530 (e.g., which may be processors or processing elements) connected to the respective node 525 (e.g., which may be a switch, router, etc.). In other examples, the node 525 is integrated with its respective terminal devices 530 in a single, integrated device such that the interconnections are internal to the integrated device.

In the illustrated example, the PCBs 510A-P contained in the chassis 500 are interconnected by the backplane 520 (such as an optical backplane) also contained in the chassis 500. In the illustrated example, the backplane 520 connects to 3×15 optical links from each PCB 510A-P, where an optical link is pair of fibers, one in each direction. The backplane 520 includes a first level, 16-way interconnection shuffle 540 to fully interconnect the nodes 525 on the 16 PCBs 510A-P included in the chassis 500. The backplane 520 also includes a second level link aggregation network 542 to connect to the ribbon cables implementing the second level interconnections between chassis, and a third level link aggregation network 544 to connect to the ribbon cables implementing the third level interconnections between chassis.

Optical backplanes may be constructed in a number of ways. An example technique is to construct the backplane using optical fibers for the communication paths, which are then bonded to an appropriate substrate.

In the illustrated example, the connectivity of the backplane 520 is as follows. The first level interconnect 540 is a fully connected network between the 16 PCBs 510A-P that are contained in the chassis 500. In this arrangement, each node 525 is connected to each other node 525 in the chassis 500 by an optical link. For a multidimensional network topology with an extent of 16 nodes in each dimension (such as in this example), each node has 15 bidirectional links in each of the three dimensions. The first set of 15 links corresponding to the first level dimension is implemented by the interconnection shuffle 540 in the backplane 520. The remaining sets of 15 links are connected to external parallel fiber connectors by the two aggregation networks 542 and 544. Each of the 16 nodes 525 in the chassis 500 has 15 neighbors in the second level dimension, and 15 neighbors in the third level dimension. The aggregation network 542 takes the same second dimension link from each of the 16 PCBs 510A-P and routes it to a parallel fiber connector with 32 fibers. Similarly, the aggregation network 544 takes the same third dimension link from each of the 16 PCBs 510A-P and routes it to a parallel fiber connector with 32 fibers. Thus, each chassis 500 of 16 PCBs 510A-P has 15, 32-way parallel ribbon connectors 550 for second dimension (L2) connectivity and 15, 32-way parallel ribbon connectors 560 for third dimension (L3) connectivity. More generally, for an extent vector $S=(S_1, S_2, S_3)$, L2 connectivity could be provided by a total of $(S_2-1)$, $(2 \times S_1)$-way ribbon cables, and L2 connectivity could be provided by a total of $(S_3-1)$, $(2 \times S_2)$-way ribbon cables. In the illustrated example of FIG. 5, each of the 15, L2 connectors links to one of the neighboring chassis 500 in the second dimension of the network, using two fibers to create a bidirectional connection between each board in one chassis to the corresponding board in the other chassis. Similarly, each of the 15, L3 connectors links to one of the neighboring chassis 500 in the second dimension of the network.

FIG. 6 illustrates the chassis grouping 600 determined by the topology implementation module 410 for interconnecting the set of 256 chassis 500 of FIG. 5 to implement the example network topology. In the illustrated example, groups of 16 chassis 500 are connected (e.g., horizontally in FIG. 6) using the 15 L2 connections from each of the chassis 500 in the group to create a fully connected network in the second level dimension, with each of the L2 connections implemented by a 32-way fiber ribbon cable. Groups of 16 chassis are also connected (e.g., vertically in FIG. 6) using the 15 L3 connections from each chassis 500 in the group to create a fully connected network in the third level dimension. The chassis grouping 600 implements a two-dimensional array with the L2 cabling running in the X dimension and the L3 cabling running in the Y dimension, thereby maintaining the regularity of cable lengths.

In the illustrated example of FIGS. 5-6, the total number of parallel fiber connections is 256×30/2=3840, as compared to the 184,320 individual connections noted initially. At least some of this reduction in the number of cables results from the use of optical backplanes 520, which implement one third of the connections. Additionally, the reduction in the number of required cable assemblies results from the use of optical ribbon cables, rather than individual cable links, to interconnect the nodes in the network topology.

While an example manner of implementing the topology development system 400 has been illustrated in FIG. 4, one or more of the elements, processes and/or devices illustrated in FIG. 4 may be combined, divided, re-arranged, omitted, eliminated and/or implemented in any other way. Further, the example topology determination module 405, the example topology implementation module 410, the example terminal 415, the example parameter input module 420, the example constraint evaluation module 425, the example topology selection module 430, the example topology iteration module 435, the example topology output module 440, the example storage unit 445, the example topology input module 450, the example dimension assignment module 455, the example board layout module 460, the example cable mapping module 465, the example chassis grouping module 485, the example layout output module 490, the example storage unit 495 and/or, more generally, the example topology development system 400 of FIG. 4 may be implemented by hardware, software, firmware and/or any combination of hardware, software and/or firmware. Thus, for example, any of the example topology determination module 405, the example topology implementation module 410, the example terminal 415, the example parameter input module 420, the example constraint evaluation module 425, the example topology selection module 430, the example topology iteration module 435, the example topology output module 440, the example storage unit 445, the example topology input module 450, the example dimension assignment module 455, the example board layout module 460, the example cable mapping module 465, the example chassis grouping module 485, the example layout output module 490, the example storage unit 495 and/or, more generally, the example topology development system 400 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended method claims are read to cover a purely software and/or firmware implementation, at least one of the example topology development system 400, the example topology determination module 405, the example topology implementation module 410, the example terminal 415, the example parameter input module 420, the example constraint evaluation module 425, the example topology selection module 430, the example topology iteration module 435, the example topology output module 440, the example storage unit 445, the example topology input module 450, the example dimension assignment module 455, the example board layout module 460, the example cable mapping module 465, the example chassis grouping module 485, the example layout output module 490 and/or the example storage unit 495 are hereby expressly defined to include a tangible medium such as a memory, digital versatile disk (DVD), compact disk (CD), etc., storing such software and/or firmware. Further still, the example topology development system 400 of FIG. 4 may include one or more elements, processes and/or devices in addition to, or instead of, those illustrated in FIG. 4, and/or may include more than one of any or all of the illustrated elements, processes and devices.

Flowcharts representative of example machine readable instructions that may be executed to implement the example topology development system 400, the example topology determination module 405, the example topology implementation module 410, the example terminal 415, the example parameter input module 420, the example constraint evaluation module 425, the example topology selection module 430, the example topology iteration module 435, the example topology output module 440, the example storage unit 445, the example topology input module 450, the example dimension assignment module 455, the example board layout module 460, the example cable mapping module 465, the example chassis grouping module 485, the example layout output module 490 and/or the example storage unit 495 are shown in FIGS. 7, 8A-B and 9. In these examples, the machine readable instructions represented by each flowchart may comprise one or more programs for execution by: (a) a processor, such as the processor 1012 shown in the example processing system 1000 discussed below in connection with FIG. 10, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1012. As used herein, the term tangible machine readable medium (or tangible computer readable medium) is expressly defined to include any type of machine (e.g., computer) readable storage and to exclude propagating signals. Additionally or alternatively, the example processes of FIGS. 7, 8A-B and 9 may be implemented using coded instructions (e.g., computer readable instructions) stored on a non-transitory machine (e.g., computer) readable medium, such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory machine readable medium (or non-transitory computer readable medium) is expressly defined to include any type of machine (e.g., computer) readable medium and to exclude propagating signals.

Alternatively, the entire program or programs and/or portions thereof implementing one or more of the processes represented by the flowcharts of FIGS. 7, 8A-B and 9 could be executed by a device other than the processor 1012 and/or embodied in firmware or dedicated hardware (e.g., implemented by an ASIC, a PLD, an FPLD, discrete logic, etc.). For example, any or all of the example topology development system 400, the example topology determination module 405, the example topology implementation module 410, the example terminal 415, the example parameter input module 420, the example constraint evaluation module 425, the example topology selection module 430, the example topology iteration module 435, the example topology output module 440, the example storage unit 445, the example topology input module 450, the example dimension assignment module 455, the example board layout module 460, the example cable mapping module 465, the example chassis grouping module 485, the example layout output module 490 and/or the example storage unit 495 could be implemented by any combination of software, hardware, and/or firmware. Also, one or more of the machine readable instructions represented by the flowchart of FIGS. 7, 8A-B and 9 may be implemented manually. Further, although the example machine readable instructions are described with reference to the flowcharts illustrated in FIGS. 7, 8A-B and 9, many other techniques for implementing the example methods and apparatus described herein may alternatively be used. For example, with reference to the flowcharts illustrated in FIGS. 7, 8A-B and 9, the order of execution of the blocks may be changed, and/or some of the blocks described may be changed, eliminated, combined and/or subdivided into multiple blocks.

Figure 7:
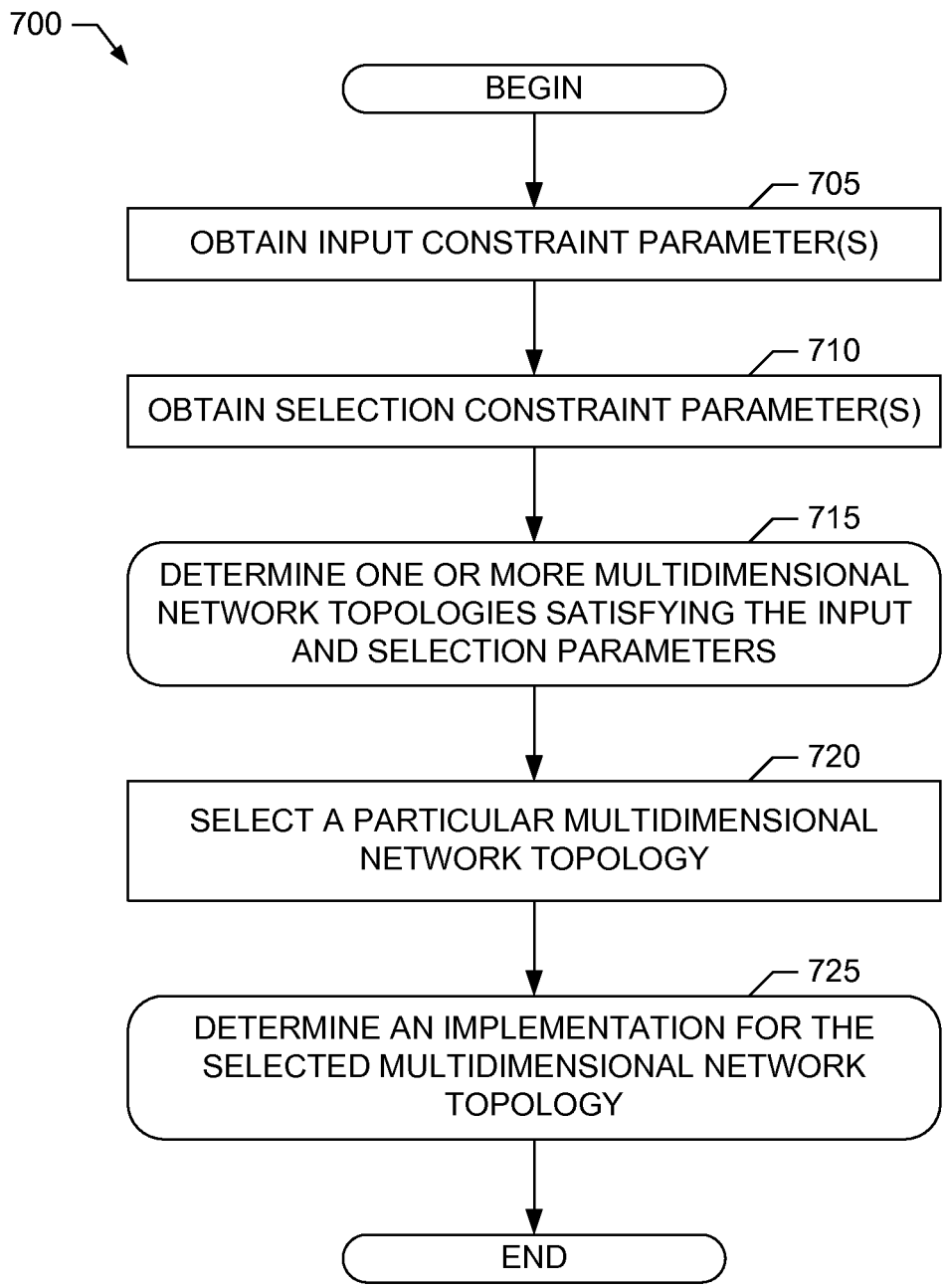
FIG. 7 is a flowchart representative of example machine readable instructions that may be executed to implement the topology development system of FIG. 4.

Example machine readable instructions 700 that may be executed to implement the topology development system 400 of FIG. 4 are represented by the flowchart shown in FIG. 7. The example machine readable instructions 700 may be executed at predetermined intervals, based on an occurrence of a predetermined event, etc., or any combination thereof. With reference to FIG. 4, the machine readable instructions 700 begin execution at block 705 of FIG. 7 at which the parameter input module 420 included in the topology determination module 405 of the topology development system 400 obtains one or more input constraint parameters to be used to determine set of multidimensional HyperX topologies satisfying the corresponding constraint(s). As mentioned above, example input constraint parameters obtained at block 705 can include, but are not limited to, a total number of terminal devices (N), a specified radix (R) for each node, and/or a bisection bandwidth (B).

At block 710, the parameter input module 420 obtains one or more selection constraint parameters to be used to select a particular topology from the set of topologies satisfying the input constraints. Example selection constraint parameters obtained at block 710 can include, but are not limited to, an indication that the selected topology is to be a fewest node topology having a minimum number of nodes relative to all other topologies satisfying the input constraints, an indication that the selected topology is to have certain implementation characteristics, such as a maximum number of dimensions, a maximum extent in any or a particular dimension, etc., or any other similar type of selection constraint.

Next, at block 715 the topology determination module 405 determines a set of multidimensional HyperX topologies satisfying the input constraint parameters obtained at block 705. Additionally, in some examples the topology determination module 405 restricts the set of multidimensional HyperX topologies determined at block 715 to include only those topologies satisfying the input constraint parameters obtained at block 705 and the selection constraint parameters obtained at block 710. Example machine readable instructions that may be used to implement the processing at block 715 are illustrated in FIGS. 8A-B, which are described in greater detail below.

Figure 9:
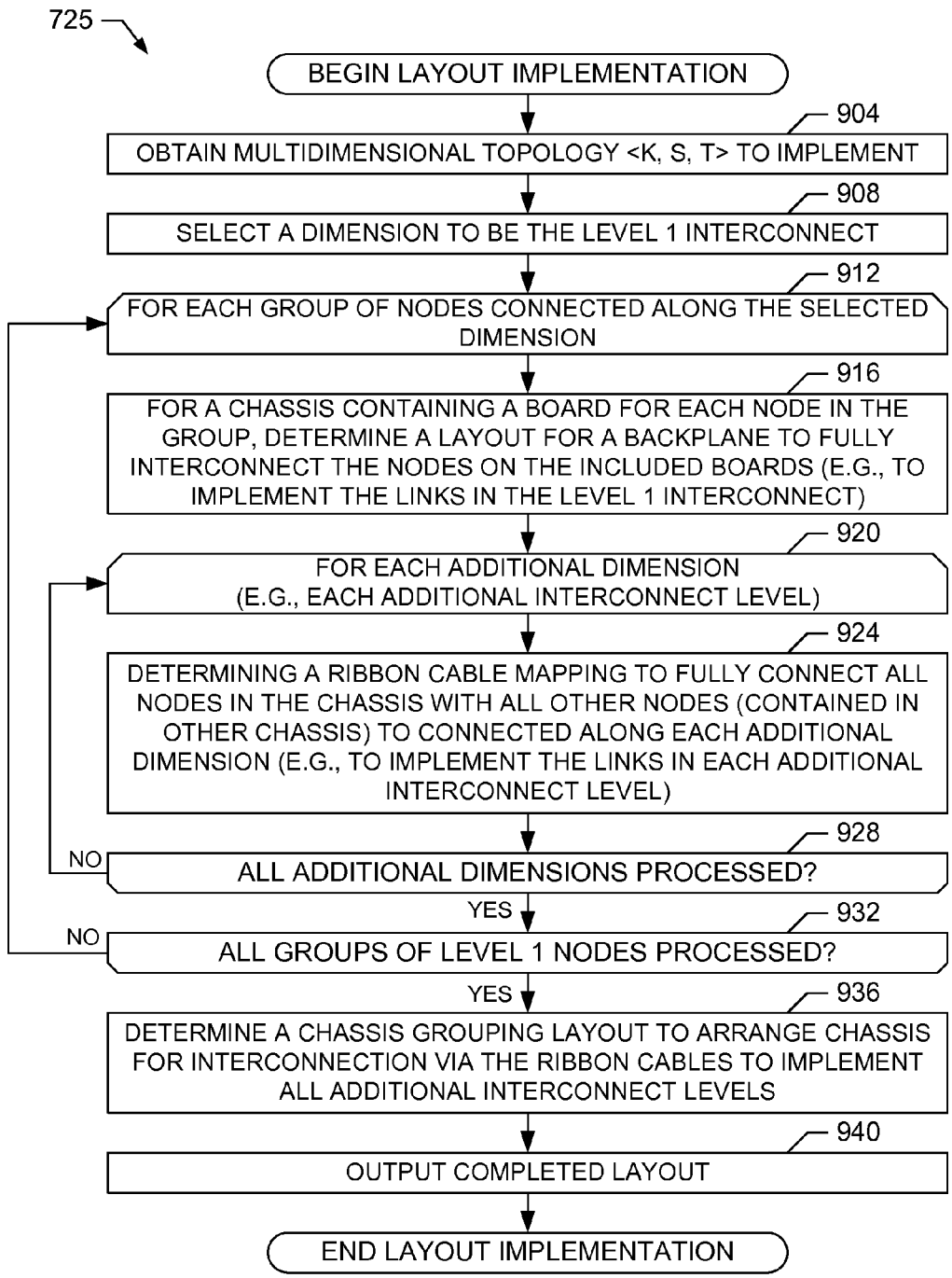
FIG. 9 is a flowchart representative of example machine readable instructions that may be executed to implement the machine readable instructions of FIG. 7 and/or topology implementation processing in the topology development system of FIG. 4.

After processing at block 715 completes, at block 720 the topology selection module 430 included in the topology determination module 405 selects a particular topology from the set determined at block 715 for implementation. Then, at block 725 the topology implementation module 410 of the topology development system 400 determines implementation information, such as dimension assignments, board and backplane outputs, cable mappings and chassis groupings, to be used to implement the particular topology selected at block 720. Example machine readable instructions that may be used to implement the processing at block 735 are illustrated in FIG. 9, which is described in greater detail below. After processing at block 725 completes, execution of the machine readable instructions 700 ends.

Figure 8A:
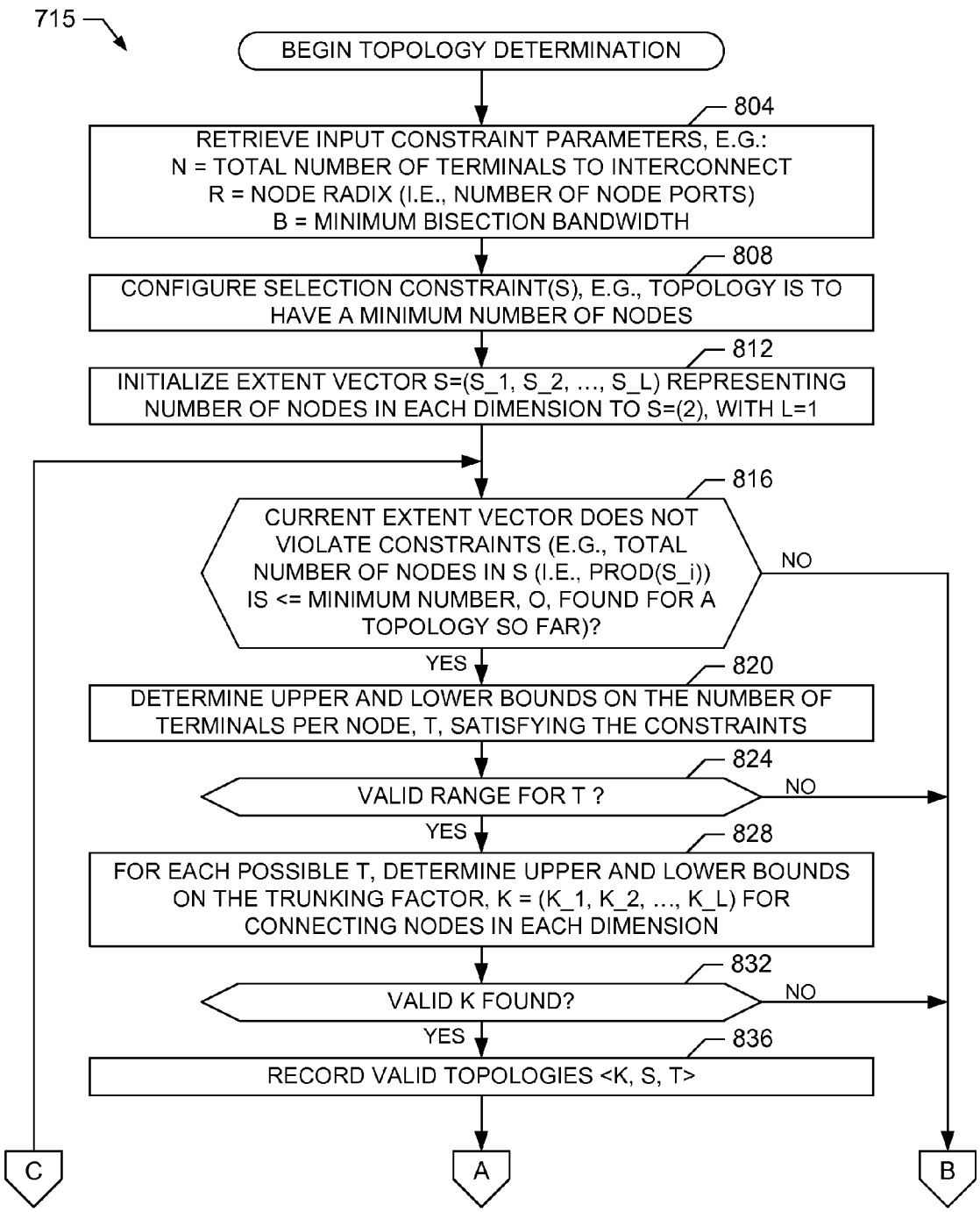
FIGS. 8A-B collectively form a flowchart representative of example machine readable instructions that may be executed to implement the machine readable instructions of FIG. 7 and/or topology determination processing in the topology development system of FIG. 4.
Figure 8B:
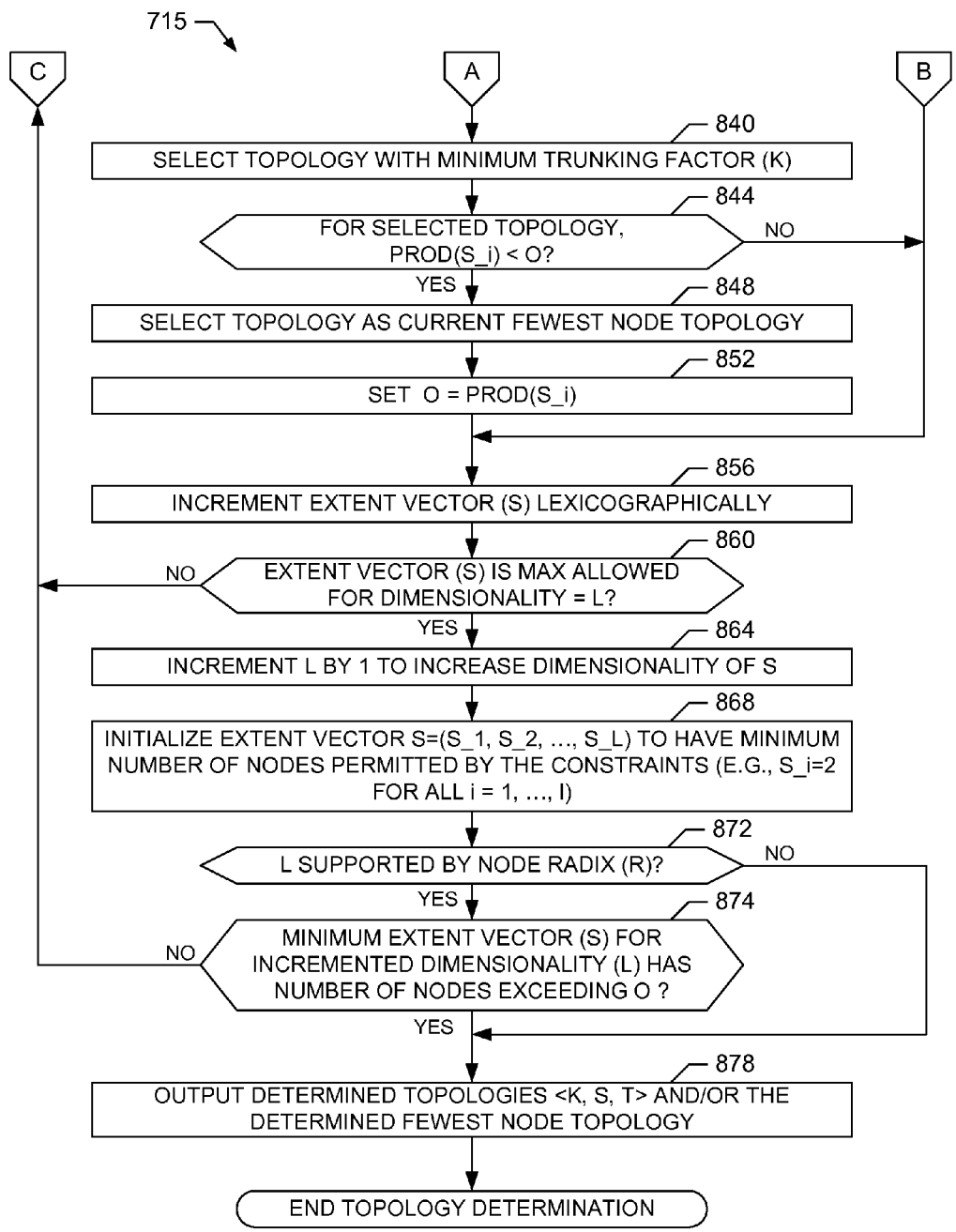

Example machine readable instructions 715 that may be used to implement the processing at block 715 of FIG. 7 and/or the topology development module 405 of FIG. 4 are represented by the flowchart of FIGS. 8A-B. With reference to FIGS. 4 and 7, the machine readable instructions 715 begin execution at block 804 of FIG. 8A at which the topology development module 405 retrieves the input constraint parameters obtained at block 705 of FIG. 7 (e.g., total number of terminal devices (N), specified radix (R) for each node, and/or a bisection bandwidth (B)) from the storage unit 445. At block 808, the topology development module 405 configures the selection constraint(s) based on the selection constraint input(s) obtained at block 710 of FIG. 7. In the illustrated example, the selection constraint corresponds to requiring the selected topology to be the fewest node topology (e.g., the topology having the minimum number of nodes relative to all other topologies satisfying the input constraints) At block 812, the topology iteration module 435 included in the topology determination module 405 initializes the extent vector S to S=2, representing the smallest dimensionality (L=1) and the smallest extent possible given the nontrivial dimension constraint of Equation 6. At block 812, the topology iteration module 435 also initializes O, the minimum number of nodes in any topology found so far, to any very large number (e.g., such as the largest numerical value that can be represented by the apparatus implementing the machine readable instructions 715).

Next, the topology iteration module 435 begins its outer loop and inner loop procedures at block 816 by invoking the constraint evaluation module 425 included in the topology development module 405 to determine whether the current extent vector S itself does not violate one or more of the input or selection constraints. For example, at block 816 the constraint evaluation module 425 determines whether the current extent vector S satisfies the node count reduction constraint of Equation 9 (e.g., requiring that the number of nodes on the topology represented by S is not greater than the minimum number 0 found so far). If the current extent vector S satisfies the evaluated constraints (block 816), then at block 820 the constraint evaluation module 425 determines upper and lower bounds on the number of terminal devices T connected to each node that satisfy the input and selection constraints. For example, at block 820 the constraint evaluation module 425 uses the network size constraint of Equation 1 and the node port constraint of Equation 2 to determine the upper and lower bounds on T. If the determined upper and lower bounds on T yield a valid range with the lower bound not exceeding the upper bound (block 824), then processing proceeds to block 828.

At block 828, for each value of T in the range defined by the lower and upper bounds, the constraint evaluation module 425 determines lower and upper bounds on the trunking factor $K_i$ for connecting switches in each dimension. For example, at block 828 the constraint evaluation module 425 evaluates the node port constraint of Equation 2, the bisection bandwidth constraint of Equation 3 and the trunking factor ordering constraint of Equation 5 to determine the lower and upper bounds on the trunking factor $K_i$ in each dimension. If the determined upper and lower bounds on $K_i$ for all dimensions yield a valid range (block 832), then at block 836 the topology iteration module 435 includes each valid topology in the set of multidimensional HyperX topologies satisfying the constraints and stores the associated topology descriptions (e.g., in the form of the triplet <K, S, T>) for each valid topology in the storage unit 445. Processing then proceeds to block 840 of FIG. 8B.

At block 840, the topology selection module 430 included in the topology determination module 405 selects the topology having the elementwise smallest trunking factor K, as this will yield the topology with the smallest node count of the set of topologies identified at block 836. The constraint evaluation module 425 then determines whether the number of nodes in the selected topology is less than the minimum node count O found so far (block 844). If so, the topology selection module 430 identifies the selected topology as being the current fewest node topology (e.g., the topology having the fewest total number of nodes so far) (block 848). The topology selection module 430 also updates the minimum node count O to be the number of nodes in the selected topology (block 852). Additionally, in some examples, the topology iteration module 435 reinitializes the set of topologies satisfying the input and selection constraints to include only the topology selected at block 848.

After processing at block 848-852 completes, or if the current extent vector S itself violates one or more constraints (block 816), or if a valid range for T is not found, or if a valid range for K is not found, then processing proceeds to block 856. At block 856, the topology iteration module 435 increments the extent vector S lexicographically, as described above in connection with FIG. 4. The topology iteration module 435 then determines whether the extent value that was incremented lexicographically by the topology iteration module 435 at block 856 exceeds the maximum value allowed for the current dimensionality L of the extent vector S (block 860). For example, at block 860 the topology iteration module 435 can invoke the constraint evaluation module 425 to determine whether the dimension ordering constraint of Equation 4 has been violated by incrementing the extent vector S lexicographically. If the incremented extent value does not exceed the maximum value (block 860), the inner loop procedure starts another iteration by returning to block 816 and blocks subsequent thereto.

However, if the incremented extent value does exceed the maximum value (block 860), then the topology iteration module 435 increases the dimensionality L of the extent vector S by one (block 864) and initializes this new extent vector to have extent values all equal to 2, the minimum number of nodes permitted by the constraints (block 868). The topology iteration module 435 then determines whether the new dimensionality L of the extent vector S is supported by the input node radix R (block 872). For example, at block 872 the topology iteration module 435 can invoke the constraint evaluation module 425 to determine whether the node port constraint of Equation 2 indicates that the node port radix R can support the increased dimensionality L of the extent vector S. If the increased dimensionality can be supported (block 872), then the topology iteration module 435 invokes the constraint evaluation module 425 to determine whether the initialized (e.g., minimum) extent vector S having the newly increased dimensionality L has a number of nodes exceeding the current minimum node count O (block 874). If not, then the outer loop procedure starts another iteration by returning to block 816 and blocks subsequent thereto.

However, if the increased dimensionality cannot be supported (block 872), or current minimum node count O is exceeded by the extent vector S having the newly increased dimensionality L (block 874), then at block 878 the topology output module 440 included in the topology determination module 405 outputs the determined set of topologies <K, S, T> satisfying the input and selection constraints. Additionally or alternatively, at block 878 the topology output module 440 can output a particular one of the set of topologies selected by the topology selection module 430, as described above in connection with FIG. 4. Execution of the machine readable instructions 715 then ends.

Example machine readable instructions 725 that may be used to implement the processing at block 725 of FIG. 7 and/or the topology implementation module 410 of FIG. 4 are represented by the flowchart of FIG. 9. With reference to FIGS. 4 and 7, the machine readable instructions 725 begin execution at block 904 of FIG. 9 at which the topology input module 450 included in the topology implementation module 410 obtains an input topology description (e.g., in the form of the triplet <K, S, T>) for a particular multidimensional HyperX network topology to be implemented. At block 908, the dimension assignment module 455 included in the topology implementation module 410 selects a dimension of the input topology to be the first level dimension. Then, for each group of nodes connected along the selected first level dimension (block 912), the board layout module 460 included in the topology implementation module 410 determines a backplane layout for a chassis containing PCBs for each of the nodes included in the group (block 916). As described above, the board layout module 460 determines a backplane layout to fully interconnect all the nodes in the chassis along the first level dimension.

Next, the dimension assignment module 455 assigns each other dimension in the topology to a second or higher level dimension, and for each higher level dimension (block 920), the cable mapping module 465 included in the topology implementation module 410 determines a cable mapping, as described above, to fully interconnect the nodes in each chassis with the other chassis containing neighbor nodes along the particular higher level dimension (block 924). After all board layouts and cable mappings have been determined (blocks 928 and 932), the chassis grouping module 485 included in the topology implementation module 410 determines a chassis grouping layout to arrange the group of chassis containing the respective groups of nodes for interconnection according to the determined cable mapping (block 936). Then, the layout output module 490 included in the topology implementation module 410 outputs the determined dimension assignments, board and backplane outputs, cable mapping and chassis groupings for implementing the input topology (block 940). Execution of the example machine readable instructions 725 then ends.

Figure 10:
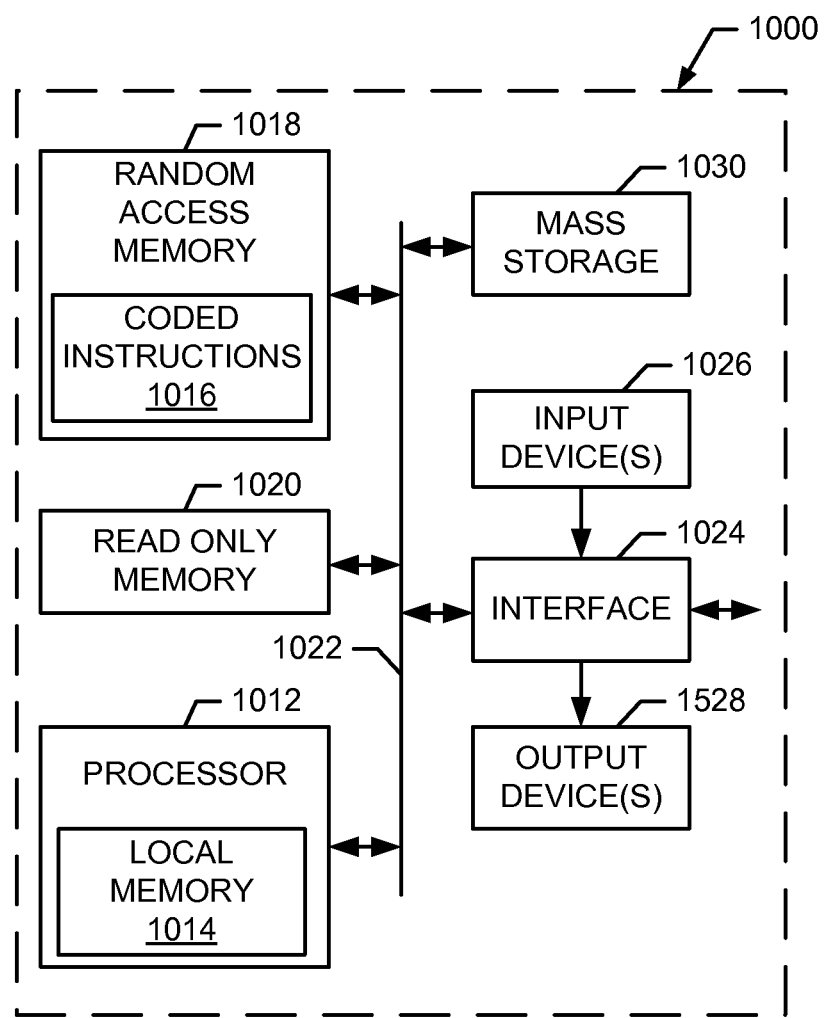
FIG. 10 is a block diagram of an example processing system that may execute the example machine readable instructions of FIG. 7, 8A-B and/or 9 to implement the topology development system of FIG. 4.

FIG. 10 is a block diagram of an example processing system 1000 capable of implementing the apparatus and methods disclosed herein. The processing system 1000 can be, for example, a server, a personal computer, a personal digital assistant (PDA), an Internet appliance, a DVD player, a CD player, a digital video recorder, a personal video recorder, a set top box, or any other type of computing device.

The system 1000 of the instant example includes a processor 1012 such as a general purpose programmable processor. The processor 1012 includes a local memory 1014, and executes coded instructions 1016 present in the local memory 1014 and/or in another memory device. The processor 1012 may execute, among other things, the machine readable instructions represented in FIGS. 7, 8A-B and 9. The processor 1012 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1012 is in communication with a main memory including a volatile memory 1018 and a non-volatile memory 1020 via a bus 1022. The volatile memory 1018 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1018, 1020 is typically controlled by a memory controller (not shown).

The processing system 1000 also includes an interface circuit 1024. The interface circuit 1024 may be implemented by any type of interface standard, such as an Ethernet interface, a universal serial bus (USB), and/or a third generation input/output (3GIO) interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, an isopoint and/or a voice recognition system.

One or more output devices 1028 are also connected to the interface circuit 1024. The output devices 1028 can be implemented, for example, by display devices (e.g., a liquid crystal display, a cathode ray tube display (CRT)), by a printer and/or by speakers. The interface circuit 1024, thus, typically includes a graphics driver card.

The interface circuit 1024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1000 also includes one or more mass storage devices 1030 for storing software and data. Examples of such mass storage devices 1030 include floppy disk drives, hard drive disks, compact disk drives and digital versatile disk (DVD) drives. The mass storage device 1030 may implement the storage unit 445 and/or the storage unit 495. Additionally or alternatively, the volatile memory 1018 may implement the storage unit 445 and/or the storage unit 495.

As an alternative to implementing the methods and/or apparatus described herein in a system such as the processing system of FIG. 10, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A computer-implemented method comprising:
   receiving a first parameter for determining a multidimensional network topology for a network interconnecting a plurality of devices; and
   determining, using a processor, a set of multidimensional network topologies, each multidimensional network topology of the set comprising a respective plurality of nodes to interconnect the plurality of devices, each node in each multidimensional network topology of the set being fully connected with all neighbor nodes in each dimension of the multidimensional network topology, each multidimensional network topology of the set satisfying a first constraint based on the first parameter, the first parameter corresponding to a radix specifying a number of ports per node to be supported by the respective plurality of nodes in each multidimensional network topology, and the first constraint to constrain each multidimensional network topology to comprise a respective number of nodes and a respective number of devices interconnected thereto that satisfies the specified radix.

2. A method as defined in claim 1 wherein each node in each multidimensional network topology is identified by a coordinate vector comprising a plurality of coordinate values, each coordinate value corresponding to a respective dimension of the multidimensional network topology, wherein a first node and a second node are neighbor nodes in a first dimension of the multidimensional network topology when each coordinate value of a first coordinate vector identifying the first node equals each respective coordinate value of a second coordinate vector identifying the second node for every dimension of the multidimensional network topology except the first dimension, and the first node is fully connected with all neighbor nodes in each dimension of the multidimensional network topology when the first node is connected to each other node in the multidimensional network topology identified by a respective coordinate vector equaling the first coordinate vector for every dimension of the multidimensional network topology except one dimension.

3. A method as defined in claim 1 wherein each multidimensional network topology further satisfies a second constraint based on a second parameter, the second parameter comprises at least one of a specified total number of devices to interconnect or a specified bisection bandwidth, and the second constraint corresponds to further requiring each multidimensional network topology of the set of multidimensional network topologies to comprise a respective number of nodes and a respective number of devices interconnected thereto that satisfies the at least one of the specified total number of devices to interconnect or the specified bisection bandwidth.

4. A method as defined in claim 1 wherein each node is at least one of a switch, a router or a bridge.

5. A method as defined in claim 1 further comprising:
using an extent vector to specify one or more multidimensional network topologies, the extent vector comprising a plurality of extent values, each extent value specifying a respective number of nodes defining an extent of the one or more multidimensional network topologies along a respective dimension;
incrementing the extent vector lexicographically to determine a set of candidate multidimensional network topologies, each candidate multidimensional network topology of the first set having a respective plurality of extent values matching the incremented extent vector;
including a particular candidate multidimensional network topology in the set of multidimensional network topologies when the particular candidate multidimensional network topology satisfies the first constraint based on the first parameter; and
iteratively incrementing the extent vector lexicographically to determine other sets of candidate multidimensional network topologies to examine for inclusion in the set of multidimensional network topologies.

6. A method as defined in claim 1 further comprising identifying a first multidimensional network topology of the set of multidimensional network topologies satisfying the first constraint and a second constraint.

7. A method as defined in claim 6 wherein the second constraint corresponds to requiring the first multidimensional network topology to comprise a minimum number of nodes.

8. A method as defined in claim 6 further comprising:
dividing all nodes included in the first multidimensional network topology into groups of nodes to be fully connected along a first dimension;
for each group of nodes, determining a backplane layout to fully interconnect the group of nodes along the first dimension, each node of a respective group of nodes to be included on a respective board inserted in a respective chassis associated with the respective group of nodes and having a respective backplane implemented according to the backplane layout; and
for each group of nodes, determining a respective ribbon cable mapping for each other dimension of the first multidimensional network topology to fully connect the group of nodes with other neighbor nodes along other dimensions, the other neighbor nodes to be included on respective boards inserted in one or more other chassis, each of the one or more other chassis to contain boards for a respective one or more other groups of nodes to be fully connected along the first dimension.

9. A method as defined in claim 8 wherein the determined ribbon cable mapping enables a plurality of chassis collectively containing all nodes of the first multidimensional network topology to be communicatively coupled in an array using ribbon cables.

10. A computer network comprising:
a plurality of devices; and
a plurality of nodes to interconnect the plurality of devices, the plurality of nodes interconnected according to a multidimensional network topology satisfying a first constraint and a second constraint, the first constraint being based on a first parameter, the multidimensional network topology comprising the plurality of nodes, each node in the multidimensional network topology being fully connected with all neighbor nodes in each dimension of the multidimensional network topology, the first parameter corresponding to a radix specifying a number of ports per node supported by the plurality of nodes, and the first constraint to constrain the multidimensional network topology to comprise a respective number of nodes and a respective number of devices interconnected thereto that satisfies the specified radix.

11. A computer network as defined in claim 10 wherein the multidimensional network topology further satisfies a third constraint based on a second parameter, the second parameter comprises at least one of a specified total number of devices to interconnect or a specified bisection bandwidth, and the third constraint corresponds to further requiring each multidimensional network topology of the set of multidimensional network topologies to comprise a respective number of nodes and a respective number of devices interconnected thereto that satisfies the at least one of the specified total number of devices to interconnect or the specified bisection bandwidth.

12. A computer network as defined in claim 10 wherein the second constraint corresponds to requiring the first multidimensional network topology to comprise a minimum number of nodes among a set of possible multidimensional network topologies, each multidimensional network topology in the set of possible multidimensional network topologies comprising a respective plurality of nodes, each node in each multidimensional network topology of the set of possible multidimensional network topologies being fully connected with all neighbor nodes in each dimension of the respective multidimensional network topology, and each multidimensional network topology of the set of possible multidimensional network topologies satisfying the first constraint based on the first parameter.

* * * * *